United States Patent Office 2,778,404
Patented Jan. 22, 1957

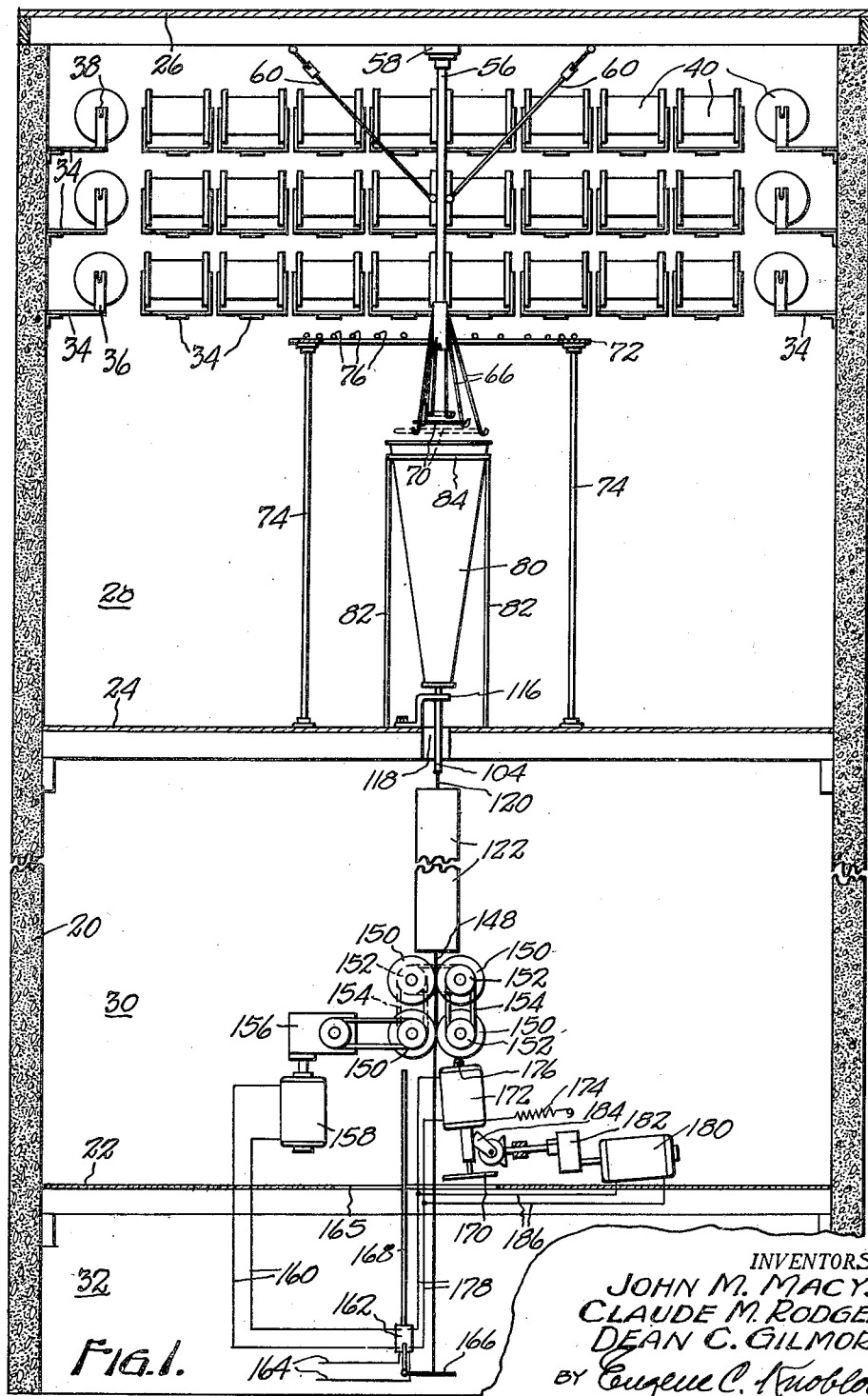

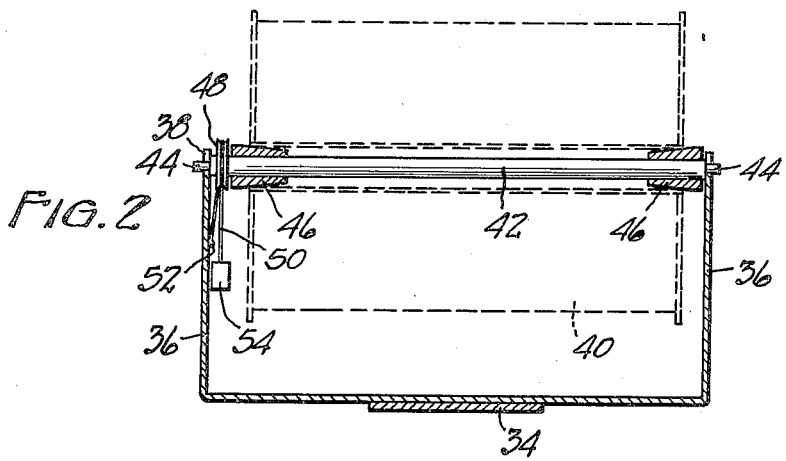
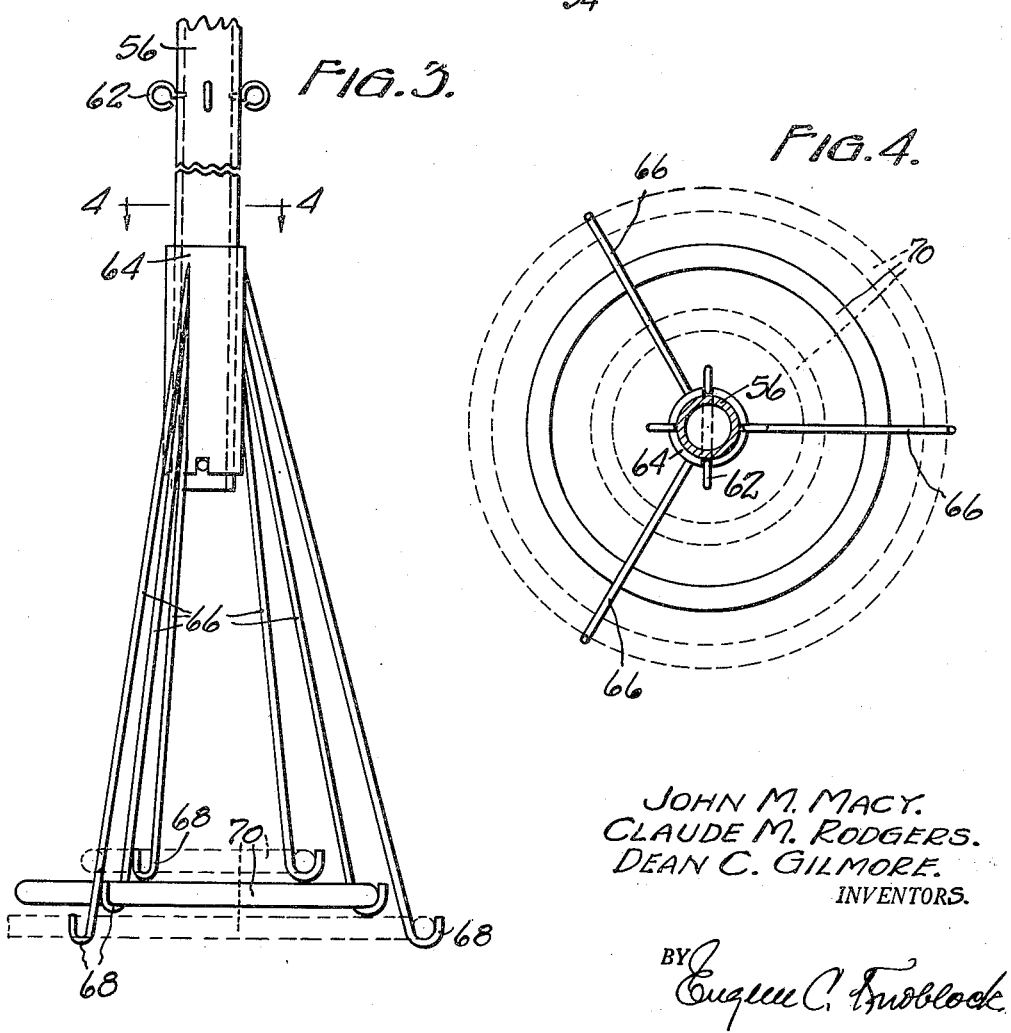

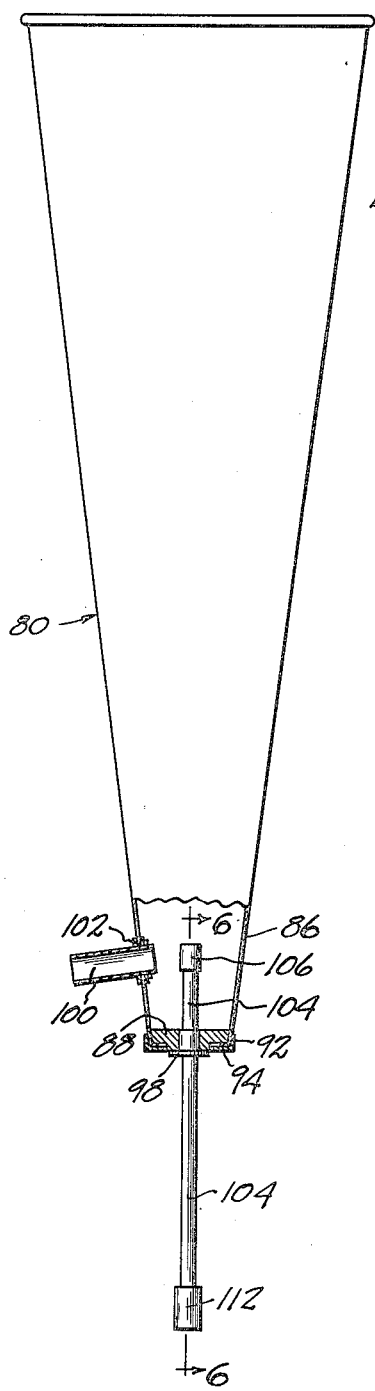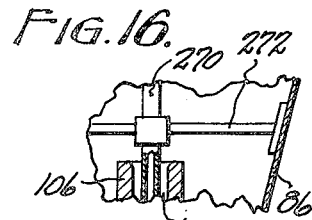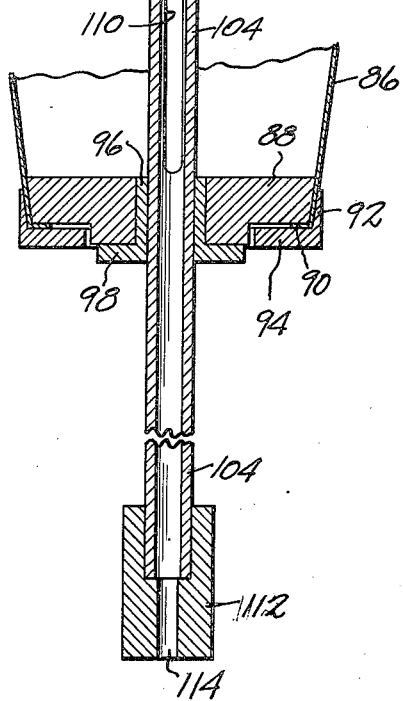

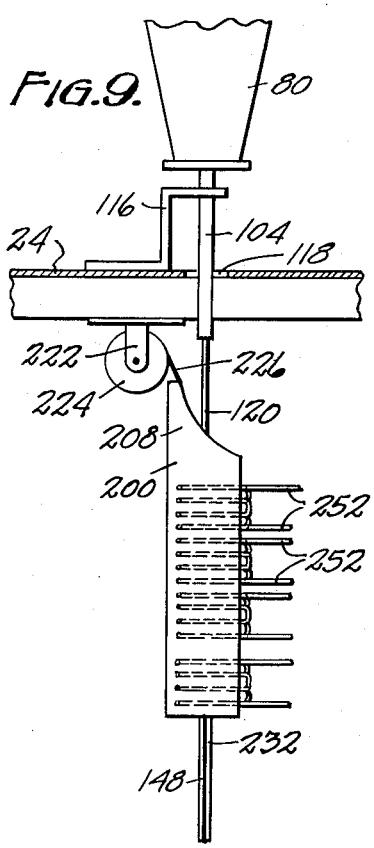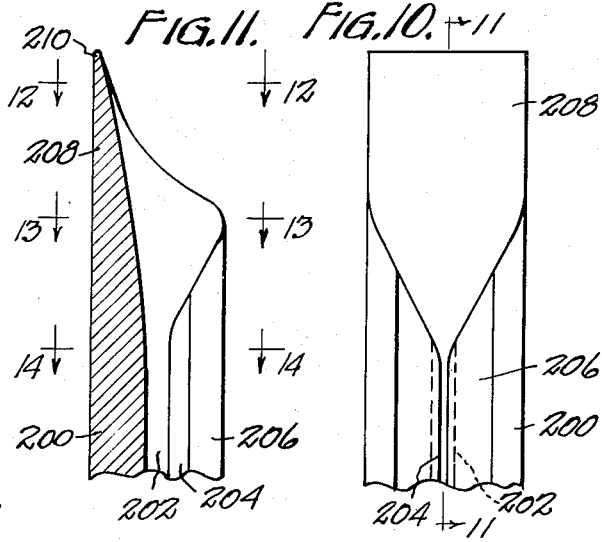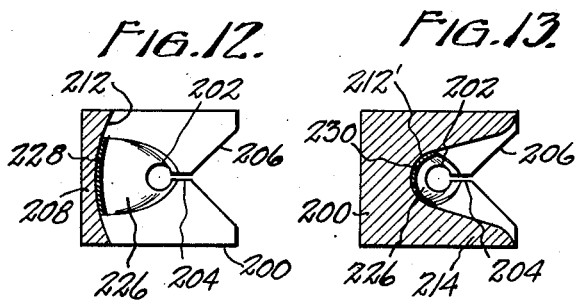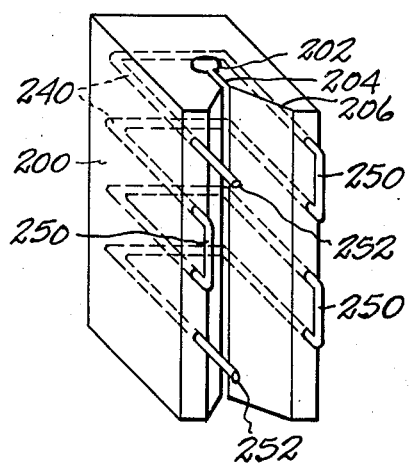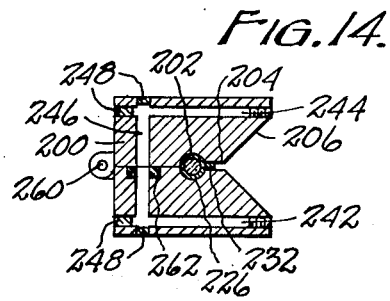

2,778,404

METHOD AND APPARATUS FOR MAKING BONDED FIBER GLASS SHAFTS

John M. Macy, South Bend, and Claude M. Rodgers, Mishawaka, Ind., and Dean C. Gilmore, Spencer, Iowa, assignors to South Bend Bait Company, South Bend, Ind., a corporation of Indiana Application March 8, 1954, Serial No. 414,716

6 Claims. (Cl. 154—1.7)

This invention relates to new and useful improvements in method and apparatus for making bonded fiber glass shafts, and more particularly for making shafts whose constituent fibers extend in parallel relation and are substantially uniformly distributed.

The primary object of the invention is to provide a novel apparatus for producing fiber glass shafts uniformly and accurately to predetermined standards in a continuous operation at a low unit cost.

A further object is to provide a method of producing a bonded fiber glass shaft wherein gravity is employed to assist movement of the fibers from a starting position to an assembling position and through wetting zones and heat setting zones.

A further object is to provide apparatus for making a bonded fiber glass shaft having parallel fiber glass strands, which operates to apply a regulated tension on all rovings or yarn of the constituent fiber glass at all times and during the entire rod making operation.

A further object is to provide an apparatus which operates to produce bonded fiber glass shafts by predetermining the location and relation of each yarn of fiber glass in the shaft so as to secure uniform and predetermined location of the fibers in the shaft in either solid or hollow form.

A further object is to provide a novel method of making bonded fiber glass shafts which entails the step of feeding the individual fibers, assembled to constitute the shaft, in a manner to insure proper orientation thereof to each other, and equal stressing of each constituent yarn at all cross-sectional points so that no stresses are locked into the shaft incident to its fabrication, and each is straight and true.

A further object is to provide an apparatus of this character, wherein various work processing and guiding elements are located in vertically spaced relation to secure a continuous downward movement of the fibers during assembly and bonding thereof.

A further object is to provide an apparatus of this character having novel means for grouping and positioning strands of fiber glass yarn in uniform or predetermined orientation and relation.

A further object is to provide apparatus of this character, including novel means for thoroughly wetting all fibers of a constituent group uniformly and for excluding air therefrom to avoid the formation of air bubbles within the finished shaft.

A further object is to provide a device of this character having novel means for tensioning each of a plurality of yarns of fiber glass as they are assembled to form a shaft.

A further object is to provide a device of this character having novel means for feeding a shaft to a discharge station and for severing the shaft in sections of predetermined length, wherein said feeding and severing means are automatically controlled to operate alternately.

Other objects will be apparent from the following specification.

In the drawing:

Fig. 1 is a part schematic view illustrating the apparatus employed to produce a bonded fiber glass shaft and the orientation and relation of the constituent parts thereof;

Fig. 2 is a view with parts shown in section, illustrating a bracket adapted to mount a reel or spool containing fiber glass rovings or yarn;

Fig. 3 is a side view illustrating a yarn guiding and assembling mechanism;

Fig. 4 is a transverse sectional view taken on line 4—4 of Fig. 3;

Fig. 5 is a view of the wetting tank with parts shown in section;

Fig. 6 is an enlarged fragmentary sectional detail view taken on line 6—6 of Fig. 5;

Fig. 9 is a fragmentary side view of a modified embodiment of the invention, utilizing a novel heating chamber of guide which may be used in the practice of our method;

Fig. 10 is an enlarged fragmentary side elevation of the heating chamber and guide;

Fig. 11 is a fragmentary sectional view taken on line 11—11 of Fig. 10;

Fig. 12 is a fragmentary transverse sectional view taken on line 12—12 of Fig. 11;

Fig. 13 is a fragmentary transverse sectional view taken on line 13—13 of Fig. 11;

Fig. 14 is a transverse sectional view taken on line 14—14 of Fig. 11;

Fig. 15 is a fragmentary perspective view of a heating chamber member, illustrating the heating means usable therewith; and Fig. 16 is a fragmentary sectional view similar to Fig. 6, and illustrating a modified embodiment.

Figure 8:
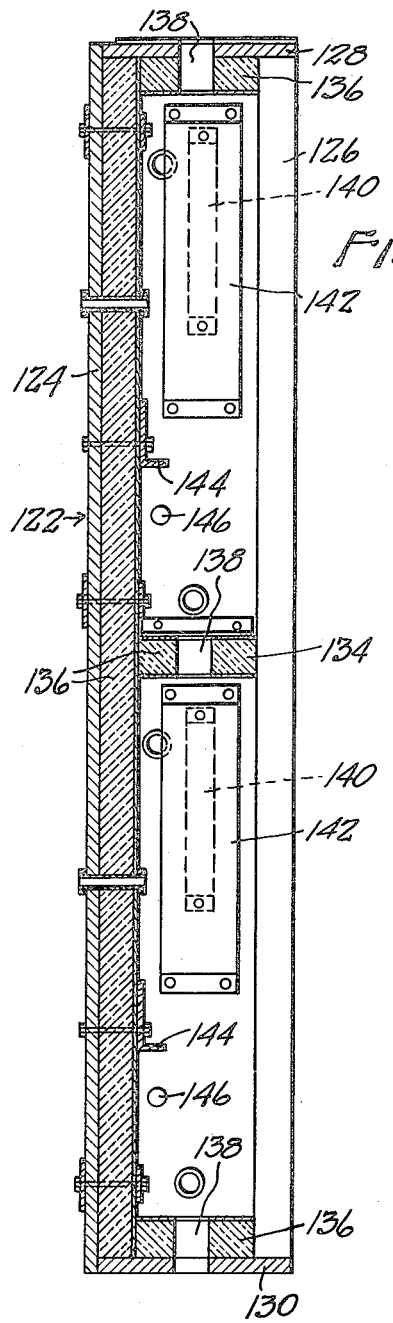
Fig. 8 is a longitudinal sectional view of the heating chamber taken on line 8—8 of Fig. 7.

Our new method entails a progressive and successive series of steps of operations performed at progressively lower levels as stock is fed downwardly or gravitally and end wise. A plurality of yarns or rovings, of which at least some are formed of fiber glass, and particularly those which are to form the outer portion of the rod, are led from spools subjected to regulated tension. The spools are arranged substantially uniformly so that fibers are fed angularly and downwardly in converging relation to each other to and through guides associated with or constituting rings, with the various guides orienting the yarns or rovings in approximately the relationship which each is to occupy relative to the others, said orientation occurring prior to bunching of the fibers and while the fibers still are spaced apart. Thence the fibers are directed in continuous converging relation and are wetted as they approach contacting relation and while they are still separated from one another. As the movement of the fibers in a downward direction continues, they are brought into contact with each other in substantially the orientation desired for the finished shaft by passing the same through a guide opening whose size and shape are substantially equal and similar to the cross-section desired in the finished product. Thereupon the assembled fibers are passed through a lower zone at which inwardly directed pressure thereagainst is released and at which a second wetting action occurs. Thereupon the fibers, still continuing in a downward direction, are again drawn together to cause the same to be adhered to each other by the bonding agent in desired cross-sectional size prior to passage into a heating chamber. The bonding material employed is preferably a synthetic resin of the thermosetting type. The bonding agent is preferably a hard adhesive within which glass fiber material may be imbedded. Examples of such adhesives are polymerizable unsaturated polyesters or a diallyl ester. Adhesives of this character may be of the compounding disclosed in any of the following United States patents: No. 2,255,313, No. 2,462,042 and No. 2,388,319.

The next step in the process is to conduct the bonded and bunched adhered fibers endwise and downwardly in a straight line movement into and through a heating zone at which the bonding agent is subjected to a heat sufficient to set or cure the same, with the resulting hardening thereof and permanent bonding of the fibers and the bonding agent into an integral shaft of solid character of substantially smooth exterior contour and free from voids or air pockets. The finished or set shaft is drawn downwardly to a delivery station at which it is severed into measured lengths.

The entire process, insofar as it entails movement of the constituents of the shaft and ultimately of the shaft itself, proceeds uniformly at all stages of the process by a pulling force exerted upon the finished shaft to pull the same endwise, supplemented by the action of gravity, and controlled or regulated by the combined action of tensioning means at the yarn spools and friction exerted upon the parts or upon the shaft at different points along the length of travel of the yarn and the shaft. The tension applied to each yarn strand is the same as that applied to the other strands, and that factor, coupled with uniformity of the rate of pull of the assembled fibers, produces uniformity of tension and other shaft properties at each cross-section of the shaft throughout its length to insure uniformity of shaft properties throughout the length of the shaft and freedom from twisting or bending forces.

The apparatus which constitutes one embodiment of the invention is illustrated in Figs. 1 to 8, inclusive, and will now be described. The apparatus is housed within a building which preferably has vertical side walls 20 and which is preferably of multiple story character so as to provide at least two different floors 22 and 24 and a roof 26. Thus the building will have an upper room 28, a lower room 30, and may have a basement or pit 32 below the lower floor 22.

A plurality of brackets or supports 34 are mounted in spaced relation in the upper portion of the upper room 28 at the side walls 20 thereof, there preferably being a plurality of horizontal rows of spaced brackets, as best illustrated in Fig. 1. Each of the brackets mounts a substantially vertical U-shaped carrier 36 at its outer or free ends spaced from the wall 20 with its free ends extending upwardly and notched at 38. The arms of the carrier 36 are spaced apart a distance greater than the length of a spool 40 which may have a tubular core and upon which is wound yarn or fiber of desired properties. Where fiber glass constitutes the yarn wound upon the spool, it may consist of any selected number of ends, each consisting of a plurality of individual strands or fibers or may be arranged in any other manner common or suitable in the art. A shaft 42 has reduced ends 44 seating and rotatable in the notches 38. Tapered bushings 46 are mounted at opposite end portions of the shaft 42, with their small diameter ends innermost and adapted to extend into the tubular core of the spool for wedged and centering support of the spool upon the shaft 42. One of the bushings 46 will preferably be spaced from the adjacent end of the carrier 36 as illustrated at the left in Fig. 2, and a V-shaped pulley 48 is fixed upon the shaft 42 or fixedly related to the bushing 46 so as to rotate with the spool 40. A cord, cable or other flexible member 50 is anchored to the bracket 36 at 52 at one end adjacent to the pulley 48 and passes therearound and mounts a weight 54 at its free end. The anchor point 52 is preferably spaced below the pulley 48 as shown.

The arrangement of the parts is such that the shaft 42 has its axis positioned horizontally, and the strand of glass roving or yarn or the "ends" thereof are pulled therefrom tangentially in a downward direction entailing rotation of the spool 40. The rotation of the spool 40 is resisted by the friction exerted by the flexible member 50 upon the pulley 48 as determined by the mass of the weight member 54. By this means free rotation of the spool is avoided, and a certain tension is applied to the yarn in order to release it from the spool. Each of the spools will be subjected to the same tension as a result of the use of weights 54 of similar mass, and, consequently, the retarding action upon the total of the strands will be equal to the sum of the retarding actions produced by the individual weights.

A substantially vertical shaft or rod 56 is suspended at its upper end to the ceiling or upper structure of the room 28 by means of a bracket 58 positioned substantially centrally of the room. Braces 60 connected to the ceiling in spaced relation to the bracket 58 and connected at intermediate points of the length of the rod or tube 56 serve to steady the rod and hold it accurately in centered and vertical position. The braces 60 may constitute cables or sectional shafts connected by turn buckles, and preferably have rings at their opposite ends adapted for connection by hooks at the ceiling and at 62 upon the upright member 56. The lower end of the upright preferably mounts a sleeve 64 of an elongated nature to which are secured one or more sets of depending downwardly outwardly diverging hooks having elongated shanks 66 and curved end portions 68. We prefer to employ three hooks in each set, which hooks are similar and are connected at the same level and in equiangularly disposed relation. Where a plurality of sets of hooks are provided, the lower curved portions 68 thereof will be located at different levels and in differently spaced relation to a projection of the axis of the upright member 56. Thus each set of curved portions 68 of the hooks is adapted to support a ring guide member 70, and such guide ring members will be arranged substantially concentrically in horizontal planes, with the smallest ring uppermost and successive rings being of progressively larger diameters, as best illustrated in Fig. 3. The rings 70 are preferably of circular or curved cross-sectional contour, so that strands passed thereover may be guided thereby and subjected to minimum stresses of a nature tending to break or sever the same.

We prefer to mount an annular member 72 of a diameter larger than the largest ring 70 substantially concentric with the rings 70 and the upright 56 at a level above the rings and below the spools 40. This annular member 72 may be mounted upon uprights 74 carried by the floor 24. The annular member 72 will preferably mount a plurality of substantially equispaced guides, such as rings, rollers or pulleys, over each of which is trained one yarn, there being guides 76 of a number substantially equal to the number of spools 40. Thus the yarn led from each spool is directed to one of the guides 76 in a downward and inward path while subjected to the tension applied by the weight 54 and the flexible member 50. The yarns then pass to a selected one of the rings 70 in a continuing downwardly converging direction, with yarns engaging each of the rings 70 at substantially uniformly spaced points. The rings 70 serve to group the yarns and select those which will be located at the center of the mass, adjacent the outer margin of the mass, and at intermediate locations, as will be apparent.

An elongated upright substantially tubular liquid container 80 is supported in upright position with its large diameter end uppermost and its axis substantially aligned with the axes of the rings 70, as illustrated in Fig. 1. The tube may be supported by uprights 82 mounted upon the floor 24 and carrying a ring 84 encircling the tank 80 adjacent its upper end. The level of the upper end of the tank 80 will be adjacent to but spaced slightly below the lowermost ring 70, and the large diameter end of the tank 80 will preferably be at least equal to or slightly greater than the diameter of the largest ring 70.

The tank 80 may be of the construction best illustrated in Figs. 5 and 6, having a frusto conical wall 86 within whose lower inner small diameter end fits a tapered plug or bottom member 88 which rests upon a flange 90 inturned from the lower end of the frusto conical tank wall 86. A ring member 92 encircles the outer lower portion of the frusto conical wall 88 and has inturned flange 94 underlying the tank flange 90. A bushing or lining tube 96 extends through a central aperture in the member 88 and preferably has a lower flange 98 underlying the plate 88. A nozzle or tube 100 is mounted within an aperture in the tank wall 88 adjacent to but spaced from its lower end and from the plate 88, as best seen in Fig. 5, said nozzle being mounted in a suitable sealed fitting 102.

An elongated tube 104 has a snug sealed fit within the tube 96 in the tank bottom 88 and is elongated to project both above and below the tank bottom 88. The upper end of the tube 104 mounts a sleeve 106 having a bore 108 therein smaller than the bore of the tube 104. The sleeve 106 is located at substantially the level of the nozzle 100 as best seen in Fig. 5. An elongated opening or openings 110 are formed in the tube 104 between the sleeve 106 and the tank bottom 88, as seen in Fig. 6. The lower end of the tube 104 carries a second sleeve 112 which has a bore 114 smaller than the bore of the tube 104 and substantially equal to and of the same shape or cross-sectional dimension as the desired rod to be formed.

The tank 80 contains adhesive which is supplied thereto through the nozzle or tubular opening 100 and which is maintained at any desired level extending above the level of the sleeve 106. The yarns or rovings pass downwardly from the guide rings 70 into the tank 80 in converging relation and enter and pass through the bore 108 of the sleeve 106. Prior to entering into the sleeve 106, the fibers will have been immersed in the adhesive so that they are in wetted condition as they enter the bore 108. The bore 108 is of such size that the fibers are brought into intimate contacting relation as they pass therethrough so as to squeeze the mass or composite of such wetted fibers. This squeezing action is relieved or released below the sleeve 106, and at this point the fibers are again subjected to a wetting action due to the passage of adhesive through the slots 110. Thus, if any air pockets existed between the fibers prior to the point of entry into the sleeve 106, the air is squeezed therefrom as it passes through the bore 108 and any uncoated portions of the fibers exposed by expulsion of the air pockets may now be reached by the adhesive flowing into the tube through the slots 110. The mass or assembly of fibers moves endwise through the tube 104 and thence through the bore 114 of the lower sleeve 112 by which fibers are again squeezed together and firmly adhered so that they will maintain their desired relation to one another as they continue to move downwardly and endwise after discharge from the bore 114 of the sleeve 112.

In order to properly orient the parts, a bracket 116 may be carried by the floor 24 to embrace the tube 104 below the bottom of the tank 80. The tube 104 will preferably be of a length to extend through an opening 118 in the floor 24, as seen in Fig. 1, so that the adhered fibers bonded in their finished form but not set, which exist at the point 120, enter the chamber or room 30.

Figure 7:
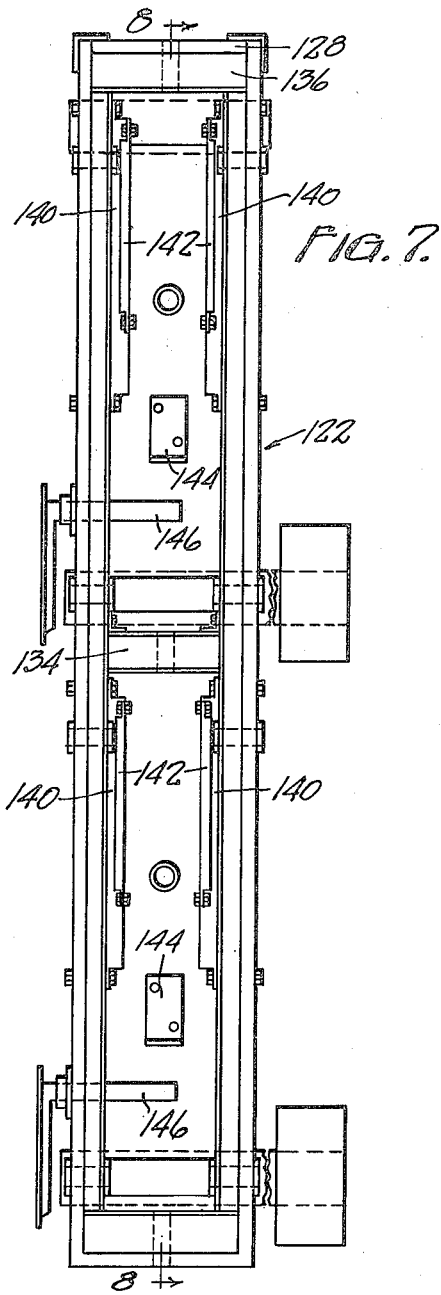
Fig. 7 is a view of a heating chamber shown in side elevation as viewed from the right in Fig. 8.

One or more heaters or ovens 122 are located in the room 30 to receive the bonded strand 120 for the purpose of heating the same to cure the adhesive and set it. The ovens or heaters 122 may be of any character found suitable, and one construction thereof is illustrated in Figs. 7 and 8. The oven has outer side walls 124 at three sides thereof and is open at 126 at the fourth side thereof which is adapted to be spanned by a door or closure plate (not shown). A top end wall 128 and a bottom end wall 130 are carried by the housing, and a substantially horizontal partition 134 is mounted within the housing. Insulation material 136 lines each of the walls 124, 128 and 130 and preferably is included in the partition 134. Each of the walls 128 and 130 and the partition 134, and the linings or insulation thereof, has a central aperture 138 therein aligned with like apertures and also aligned with the tube 104. The oven, here illustrated, is intended to be heated electrically, and for this purpose each chamber or compartment thereof will be provided with one or more electrical heating elements 140, preferably extending lengthwise thereof and parallel to but laterally spaced from the axes of the apertures 138. Heat baffle plates 142 will preferably be positioned between juxtaposed heating elements 140 to prevent direct radiant heating of the fiber glass mass or strand passed through the oven between the aligned openings 138. Each chamber or compartment of the oven will preferably be provided with a bracket 144 for mounting a thermostat (not shown), and likewise each chamber will preferably have a thermometer 146 extending therein. Both the bracket 144 and its thermostat and the thermometer 146 will be so located as to be free of or clear of the path of the fiber glass strands as they pass through the oven between the apertures 138.

The oven or ovens are adapted for control of temperature or heat as required to initiate and then complete the thermal setting of the adhesive, during the time that is required for a given point upon the bonded fiber glass strands to pass completely through the oven or ovens and to be discharged therebelow. Thus the fiber glass strand or bar 148 which emerges from the bottom of the oven 122 has been completely set and hardened, and has assumed its final permanent structure, dimension and shape. It is interesting to observe in this connection that the endwise pull upon the bonded fiber glass continues as the setting action takes place within the oven. This tension is, of course, the same tension which acted upon the bonded fibers and the individual fibers prior to bonding thereof through the preceding stages of the process and back to the initial unwinding thereof from the spools 40.

The tension upon the fibers and the shaft, both in its finished and in its partly finished stages, is exerted by means of a plurality of friction rollers 150 which are grooved to receive the bar 148 therebetween to exert a pull endwise thereon in a downward direction. As here shown, two sets of rollers 150 are provided, said rollers being driven in synchronism by any suitable means, such as gears, chains and sprockets, belts and pulleys, or the like. For purposes of illustration, a plurality of pulleys are here illustrated and identified by the numeral 152 and are shown as having belts 154 trained around and so oriented and related that rollers on opposite sides of the bar 150 travel in a proper direction to exert a downward pull upon the bar 148, and all of said rollers travel at the same speed. The rollers 150 are preferably driven from a speed reducer 156 connected with the drive shaft of a motor 158 having electrical leads 160 extending to a switch 162 controlling current from the lines 164 and being located in a chamber 32 below the floor 22 and accessible through an opening 165. The switch 162 will preferably be associated with a trip member 166 located below the floor 22 and in the path of the shaft 148 to be engaged by that shaft. The switch 162 will preferably be of the type which normally establishes a closed circuit condition with the motor 158 and which is tripped by the member 166 to open the circuit to the motor 158 to stop the feeding operation of the rollers 150 when the shaft 148 has tripped the member 166. The switch 162 will preferably be mounted upon a support 168 by means of which the vertical position of the trip member 166 may be adjusted.

A bodily shiftable cutter 170 is driven by a motor 172, and the motor cutter unit is adapted to swing between a retracted position clear of the shaft 148 and preferably above the floor level 22 as illustrated, which retracted position is determined by the spring 174. As here shown, the motor cutter unit swings about a pivot axis 176, but this is understood to be illustrative, and the movement of the cutter and the motor may be bodily and linear or may proceed in any other manner and direction instead of being pivotal as illustrated. The motor 172 is controlled by leads 178 extending to the switch 162 and energized only at such time as the shaft 148 has tripped the trip member 166.

The third motor 180 has a driving connection, preferably through a speed reducer 182 and associated gearing, with a cam 184. The cam 184 is associated with the cutter unit 170 and normally is positioned in such a manner as to permit the spring 174 to hold the cutter clear of the shaft 148. The motor 180 is connected by leads 186 with the leads 178 or otherwise with a switch, as 162, associated with and operated by the trip member 166. Operation of the motor 180 causes rotation of the cam 184 in such a manner as to swing or move the cutter 170 in a direction to engage and cut the shaft 148. The switch 162 is so constructed or has associated therewith additional elements which will serve to hold closed the circuits to the motor 172 and 180 after intitial energization thereof until such time as the cam 184 has made one revolution so that the cutter 170 has passed through a stroke to cut the bar 148 and then resumed retracted position. Thus the electrical system of the device will be controlled by one or more switches 162 under the control of the trip member 166 to normally operate the motor 158 and the rollers 150 to feed the shaft 148 in a downward direction endwise toward the trip member 166. As soon as the end of the shaft engages and trips the member 166, the switch or switches 162 open the circuit to the motor 158 to stop the feeding action and start operation of the motors 172 and 180 to operate the cutter 170 and to swing the cutter into engagement with the shaft 148 in a path crosswise of that shaft. The movement of the two motors 172 and 180 is controlled by the switch or switches 162 and/or associated electrical parts of the character well understood in the art and of a nature to time the operation until such time as the cam 184 returns to its starting position. Thereupon the motors 172 and 180 are deenergized and the motor 158 is again energized, so that the feeding operation can again commence.

It will be apparent from the foregoing description of the apparatus that it serves effectively and substantially continuously to perform the various steps of the method first above described for the purpose of fabricating from a plurality of yarns of fiber glass and/or other filamentary material and an adhesive, a bonded hardened straight shaft of uniform properties and cross-section throughout its length and free of variation in stress or of other conditions which might tend to bend the same, so that it is straight, it is compact, it is uniform, it is solid, and is of desired cross-sectional shape.

One of the important elements of the apparatus and parts of the method entails the heating of the adhesively bonded fibers to cause the synthetic resin to take a permanent set and at the same time to maintain the shape of the strand or composite during the setting operation. In the method and apparatus above described, reliance is placed upon the pull exerted endwise in a downward direction upon the assembled adhered fibers to maintain them in the relation in which they previously were assembled, the operation being conducted insofar as heating is concerned within an open chamber without confining or in any other mechanical way shaping the adhered fibers. Apparatus by means of which a mechanical shaping and confining of the resin and fiber assembly may be conducted is illustrated in Figs. 9 to 15. In this instance an elongated heated metal bar having a guide passage therethrough is used to simultaneously confine the adhered fibers and to heat the adhesive to cause it to take its permanent set.

The metal bar 200 has a longitudinal passage 202 extending therethrough spaced from the side walls thereof so as to be substantially centrally located and having a cross-sectional size and shape corresponding to the desired shape and cross-section of the rod to be produced but with its cross-sectional size accommodating a wrapping element to be described. A narrow slot 204 preferably communicates with the passage 202 and in turn opens at a tapered groove or mouth portion 206 extending lengthwise of the bar 200, so as to reduce the width of the slot 204 even though it is located at a substantial distance from the face of the bar 200 at which the mouth 206 opens. At its upper end the bar 200 tapers to define an upwardly projecting lip portion 208 preferably located along the side of the bar 200 remote from the side or face at which the groove 206 is formed. The lip will preferably be shaped substantially as illustrated, commencing with a substantially straight tip portion 210 of curved cross-sectional shape, as seen in Fig. 11, and progressively widening and assuming a flaring general shape or outline which merges progressively into the cross-section of the major portion thereof, as illustrated in Fig. 14. Figs. 11, 12 and 13 illustrate the changing of the shape or cross-section of the bar progressively from its tip downwardly. Thus Fig. 12 illustrates the development of a concave surface at the inner face of the lip 208 adjacent its upper free tip 210. The curvature of this concave surface 212 changes progressively about a progressively reducing radius until the form illustrated in Fig. 13 is reached substantially at the point that the full overall cross-sectional outline of the bar is assumed, as illustrated in Fig. 13. At this time the concave surface 212′ is slightly larger in radius than the passage 202 and lips or flanges 214 have extended to the notched face of the bar. Thereupon continuous construction of the passage occurs somewhat comparable to the shape of a funnel within the zone between the parts at which section lines 13—13 and 14—14, respectively, are taken, as seen in Fig. 11.

A bracket or support 222 is mounted at a level above the bar 200, as at the floor 24 defining the upper part of the chamber 30 in which the heating member is located, and this bracket serves to journal a spool 224 carrying a strip of film material 226, such as cellophane, paper, or any other material found suitable for the purpose to be described. This film will be flexible and will unroll against retarding tension and pass downwardly with a guided action over the lip tip 210 to engage the inner surface of the lip 208.

The passage 202 of the bar 200 will be located in axial alignment with the conduit 104 from which the adhered bunch of fibers 120 is discharged, as illustrated in Fig. 9. Consequently, that adhered bunch of fibers 120 passes downwardly from the conduit 104 to enter the passage 202 which is of the same shape as the cross-section of the finished bar 148 but has clearance therewith sufficient to accommodate the encircling of the bunch of adhered fibers by the film 226. The film 226 is fed at the same rate as the adhered bunch of fibers as a result of the frictional engagement of the parts, and is caused by the shape of the upper end of the bar 200 to wrap itself around the adhered fibers in such a manner as to prevent any contact between the bunch of adhered fibers 120 with the block 200. This operation proceeds substantially as illustrated in Figs. 12, 13 and 14 with the initial action entailing progressive transverse bending or curving of the film at 228 as it travels along the concave surface 212. As observed in Fig. 13, as the curvature increases to that shown at 230, the side edges advance progressively toward an embracing relationship, and in particular advance to positions at which they are caused to enter the slot 204. Thus by the time the film reaches a position as represented by section line 14—14 of Fig. 11, the film 226 completely encircles the adhered fibers 120, and the marginal portions 232 of that film are brought into substantially face engagement with each other within the slot 204. Thus a substantially continuous confinement of the adhered fibers 120 occurs and they are positively separated from contact with the material of the bar 200 by the film. The film, having a dry exterior, will slide freely within the passages 202 and 204 of the bar so that no danger of sticking of the parts occurs. The film 226 will, of course, be of such material that it may be stripped from the finished bar 148 after the formation of that bar or rod 148 has been completed.

In order to provide for control and regulation of the temperature of the bar 200 along its length, an arrangement as best illustrated in Figs. 9 and 15 is preferred. At a plurality of closed spaced levels along the height or length of the bar 200 are formed C-shaped passages 240. Each of these passages preferably comprises three intersecting bores 242, 244, 246 formed transversely through the bar spaced from the central passage 202 and intersecting or communicating with each other. The ends of the passages 242 and 244 opening at the face of the block at which the groove 206 is formed are tapped or screw-threaded, as shown in Fig. 14. The ends of each of the passages 242, 244, 246, except the tapped ends previously mentioned, are plugged at 248 at the ends thereof outwardly of the point of intersection. In this way, fluid, such as steam, hot water or the like, which enters at one tapped end of the communicating passages will proceed in a C-shaped path to exhaust at the tapped end of the opposite passage. Selected C-shaped passages at different levels are interconnected, as illustrated schematically in Fig. 15, by U-shaped conduits 250 extending externally of the bar 200 and connected at the tapped ends of the passages 242 and 244 by any suitable fitting (not shown) in the manner well understood in the art. It is preferred, however, as best seen in Fig. 9, that only the passages 240 at restricted zones or portions of the bar 200 shall be connected, and that intake and outlet passages or conduits 252 connected with a fluid heating system (not shown), such as a hot water circulating system or a steam generating system, will limit flow of heating medium through associated zones of the bar 200. Thus it is possible through suitable valve means to control the rate of flow of the heating medium at different zones and thereby control the temperature at which each individual zone of the member operates. This affords a flexibility particularly well suited for the desired operation of causing the thermosetting resin to take a set.

As an example of the processing, the zone nearest the point of entry may be of a pre-heat temperature. Succeeding zones may have temperatures increased until a zone at which the chemical reaction of the adhesive occurs. At this time the chemical reaction may entail the generation of internal heat so that it is possible to reduce the amount of heat supplied, and the lower portions or zones of the block 200 may, therefore, operate at temperatures much lower than the zones adjacent to or preceding the zone at which the setting action occurs.

In order to facilitate initial loading of the block 200, it may be desirable to form the same in two parts or halves, as illustrated in Fig. 14, which are hinged together at 260 in a manner to permit the two halves to swing apart and afford acess to the bore 202 thereof, it being understood that the parting plane of the halves will be located substantially as illustrated in Fig. 14 to pass substantially centrally through the bore 202 and in the plane of the slot 204. This arrangement causes the block parts to be separated in a plane intersecting the steam passage 246. Suitable sealing means may be provided to prevent leakage at the parting plane, such as the annular gasket 262 received in a recess concentric with the mouth of the passage 246 at the parting face of the block parts and preferably slightly oversize in its axial dimension so that it is firmly and continuously engaged by the other part of the block when the two block parts are swung inwardly to closed position, as illustrated in Fig. 14.

The apparatus and method described up to this point have been particularly directed to the formation of a solid fiber glass shaft. It is possible, with a slight change, to use the same apparatus to produce a tubular shaft. The change in apparatus required is illustrated in Fig. 16, wherein an upright mandrel member 270 is illustrated as being mounted by a support 272 carried by the walls of the tank 86 in a position concentric with said tank and with the sleeve 106. The mandrel 270 will be of a size to enter the bore 108 of the sleeve 106 with clearance which will determine the wall thickness of the shaft to be produced. The mandrel 270 may extend into the tube 104 as to a level at or below the bottom of the slot 110. The mandrel may be either solid or tubular, and, as shown in Fig. 16, is tubular. The tubular formation of the mandrel accommodates its connection to a source of compressed air so that air may be discharged therefrom into the formed tube to assist in holding the formed tube in tube shape until the tube has taken its final shape incident to the setting of the resin or adhesive.

While the preferred embodiments of the invention have been illustrated and described, it will be understood that changes in the construction and in the practice of the method may be made within the scope of the appended claims without departing from the spirit of the invention.

We claim:

1. The method of making shafts from a plurality of fibers bonded by a thermosetting synthetic resin, consisting of the steps of withdrawing fibers from a plurality of spools in a downward direction and maintaining a predetermined tension on each, guiding said fibers in converging relation, immersing said fibers in a container of resin while in spaced relation, bunching said resin wetted fibers in said container to selected close spaced parallel relation, releasing the fibers from close bunched relation while moving downwardly in said container to accommodate further wetting thereof by said resin, rebunching said fibers to compact parallel relation adhered by said resin while withdrawing the fibers downwardly from the bottom of the container, and heating said adhered and bunched fibers to set said resin while pulling the same downwardly under predetermined tension.

2. The method of making shafts from a plurality of fibers bonded by a thermosetting resin, consisting of the steps of withdrawing fibers from a plurality of spools in downwardly converging paths to a collection point and thence downwardly in substantially parallel close spaced paths under a continuous and uniform tension, wetting the fibers with resin while converging so that the fibers are continuously adhered after leaving said collection point, and heating said adhered fibers to set said resin as the fibers move from said collection point, and pulling downwardly upon the finished bonded shaft to propel said fibers under selected tension.

3. The method of making shafts from a plurality of fibers bonded by a thermosetting resin, consisting of the steps of withdrawing fibers from a plurality of spools in downwardly converging paths to a transversely confined collection point and thence downwardly in substantially parallel close spaced paths under a continuous and uniform tension, wetting the fibers with resin while converging so that the fibers are continuously adhered after leaving said collection point, further wetting said fibers after adhesion thereof at said collection point and while tensioned but free from transverse confinement, and then heating said adhered fibers to set said resin while tensioned.

4. The method of making shafts from a plurality of fibers bonded by a thermosetting resin, consisting of the steps of withdrawing fibers from a plurality of spools in downwardly converging paths to a collection point and thence in substantially parallel close spaced paths under a continuous and uniform tension, wetting the fibers with resin while converging so that the fibers are continuously adhered after leaving said collection point, squeezing the bunch of wetted fibers at said collection point to adhere them and eliminate air bubbles in the adhered mass of fibers, again exposing the mass of adhered fibers to resin after said squeezing to secure uniform and continuous distribution of resin therein, and then heating said mass to set the resin while tensioned.

5. The method of making shafts from a plurality of fibers bonded by a thermosetting resin, consisting of the steps of withdrawing fibers from a plurality of spools in downwardly converging paths to an assembly point in uniformly disposed relation around a mandrel and thence in parallel paths under continuous and uniform tension, wetting the fibers with resin while converging so that the fibers are adhered by the resin in tubular form at the assembly point and discharging air under pressure endwise from said mandrel and into and longitudinally through the tubular assembly of fibers, and heating the adhered fibers to set said resin.

6. Apparatus for making resin bonded fibrous shafts, comprising a plurality of fiber carriers arranged at a substantially uniform level, fiber guides below said carriers to direct fibers from said carriers in downwardly converging paths, a resin container below said guides, an elongated open ended vertical tube at the lower end of said container for guiding said fibers through said container to adhered close spaced relation, means below said container and substantially aligned with said tube for heating said adhered fibers to set said resin, and means below said heating means for pulling downwardly and endwise the shaft produced in said heating means, said open ended tube projecting above the bottom of said container and having a bore with a reduced upper part and a transverse opening therein between its reduced bore portion and the bottom of the container.

References Cited in the file of this patent

UNITED STATES PATENTS

| | | |
|---|---|---|
| 285,673 | Phillips | Sept. 25, 1883 |
| 874,287 | Bayne et al. | Dec. 17, 1907 |
| 1,245,067 | Tew | Oct. 30, 1917 |
| 1,421,306 | Rawlings | June 27, 1922 |
| 2,127,413 | Leguillon | Aug. 16, 1938 |
| 2,476,582 | Browne et al. | July 19, 1949 |
| 2,571,717 | Howald et al. | Oct. 16, 1951 |
| 2,625,498 | Koch | Jan. 13, 1953 |
| 2,665,757 | Stevens et al. | Jan. 12, 1954 |
| 2,684,318 | Meek | July 20, 1954 |

FOREIGN PATENTS

| | | |
|---|---|---|
| 813,697 | Germany | Sept. 17, 1951 |